Nov. 1, 1932.  S. A. MAIN  1,885,614
AIR HOSE COUPLING
Filed June 13, 1931
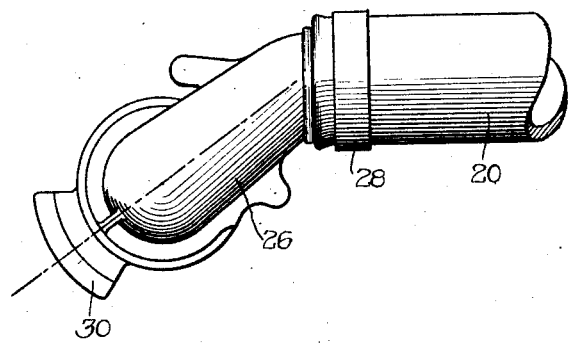
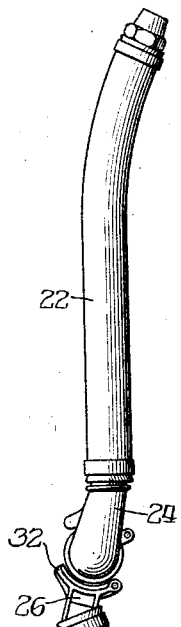
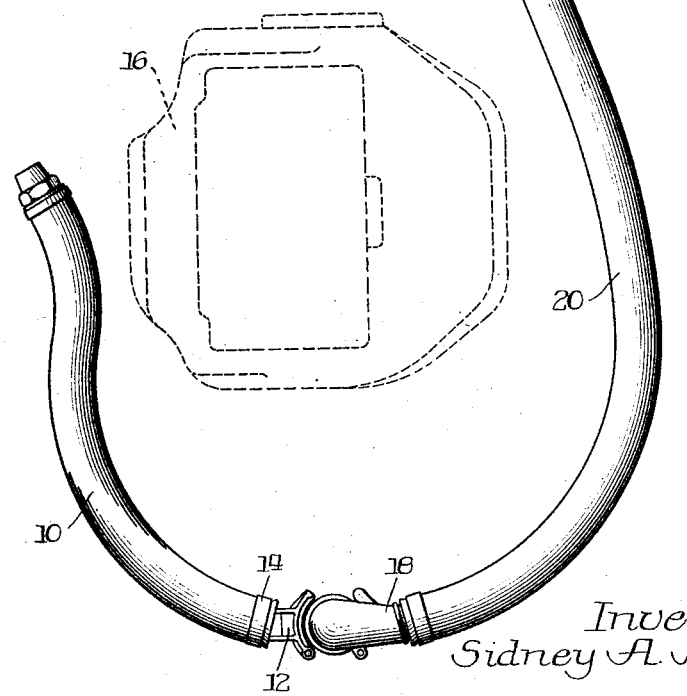
Inventor
Sidney A. Main
By Usina and Rauber
Attys Patented Nov. 1, 1932

1,885,614

UNITED STATES PATENT OFFICE

SIDNEY A. MAIN, OF DULUTH, MINNESOTA

AIR HOSE COUPLING

Application filed June 13, 1931. Serial No. 544,227.

The invention relates to air hose couplings for railroad cars and has special reference to an auxiliary section of air hose with coupling means for use principally on ore cars.

It is the usual practice for the two sections of air hose to be coupled together and to extend diagonally across the space between the cars below the car coupler. The normal tendency of the connection therefore is to hang so as to tighten the engagement of the couplings.

The practice in ore cars is rather unusual since instead of the train line pipes terminating at the end of the car they are carried up vertically so that the hose connections are near the top of the car body where they are coupled and extend diagonally across as before. This construction keeps the hose connections out of the dirt of the road bed and makes the act of connecting more convenient and safer for the brakeman. It frequently happens that it is necessary to couple the air lines of one of these cars with a car having the usual installation and in order to accomplish this an auxiliary link of hose is used. In practice, however, difficulty arises due to the construction of the standard coupling which causes the couplings to loosen instead of holding them in tight engagement.

An object of the invention is to overcome the above difficulties and accordingly the invention contemplates the provision of a novel arrangement whereby the hose couplings will be held in firm connected relation when in use, permitting, however, ready and easy separation.

A further object is to provide a novel coupling for an auxiliary air hose which when connected to a normal coupling will hold the members under all conditions in secure engagement without resorting to the use of chains, wires or similar devices.

With these and various other objects in view, the invention may consist of certain novel features of construction and operation as will be more fully described and particularly pointed out in the specification, drawing and claims appended hereto.

In the drawing which illustrates an embodiment of the device, and wherein like reference characters are used to designate like parts—

Figure 1 is an end elevational view of a complete air hose connection with the auxiliary hose embodying the structure of the present invention, and Figure 2 is a top plan view of the improved form of air hose coupling.

The standard construction of air hose coupling means is such that when the two co-operating halves are connected they must be turned upwardly toward each other to accomplish the attachment and thus when allowed to hang naturally in operative position the normal tendency of the flexible hose is to cause a turning of the couplings so as to hold them in connected relation.

This is illustrated in Figure 1, wherein an air hose 10, secured at its upper end by any suitable means to the train pipe of the car (not shown) has attached at its lower end a standard coupling 12, the coupling and hose being held together by the metal ring 14. The hose 10 passes under the car coupler 16 and is connected to a co-operating coupling 18, the same being secured in a similar manner to the auxiliary hose 20. It will be observed that the normal tendency of hose 10 and 20 is to assume an arcuate position, which position, when the couplings 12 and 18 are attached, will cause a turning movement of the same in a direction to hold the members in firm engagement. By turning the couplings upward and toward each other they can be very easily detached.

Since the air hose 10 is suitably secured to the train pipe of one car the air hose 22 is likewise suitably secured to the train pipe of the other car with the exception that in this instance the train pipe terminated near the top of the car body so that the air hose depending therefrom terminates short of the car coupler. This necessitates a length of auxiliary hose as described. The hose 22 is provided at its lower depending end with a coupling 24 of the usual standard construction and which is adapted to have connection with the coupling at the upper end of the auxiliary hose, the construction of which will be presently described.

In the standard coupling it will be noted that the shank is offset, which can be described when viewed in top plan as extending in a direction clockwise with relation to the center line of the hose when extended, as illustrated with couplings 18 and 24, Figure 1. Heretofore it has been the practice to provide the upper end of the auxiliary hose with a standard coupling, but difficulties were encountered since the flexible air hose when hung in vertical position did not tend to hold the couplings in connected relation. In order to overcome this the present invention contemplates a form of coupling as shown in detail in Figure 2, wherein the coupling 26 is secured in the usual manner to the auxiliary hose 20 by the metal ring 28. The coupling head is provided with the usual locking flanges 30 and 32 adapted, upon rotary movement of the head, to interlock with co-operating flanges on the associated coupling. In this coupling the shank is offset in a reverse direction from that of the standard coupling since the shank as shown in Figure 2 can be described as having a bend in a direction which is counter-clockwise in relation to the center line of the hose when extended.

In Figure 1 the coupling 26 is shown in bottom plan view attached to the standard coupling 24 with the air hose 22 and 20 assuming their natural position. With this construction it will be observed that the couplings 24 and 26 will be urged in an outward direction by reason of the particular reverse bend in the coupling 26. When the same is associated with a standard coupling and when the flexible portions of the hose are allowed to hang vertically the couplings are yieldingly urged to turn in a direction which is opposite to that necessary to couple them so that the couplings are actually held in connected relation. The force exerted on the couplings tending to rotate them is due partly to the weight of the auxiliary hose and to the tendency of the upper portion adjacent the coupling to travel outwardly since its lower portion is held in an arcuate position. The normal tendency of the couplings is to remain in secure and connected relation, permitting easy separation, all of which is accomplished by a simple construction and one that does not require the use of extra parts such as chains or wires.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. Means for connecting the air line between railroad cars and the like, including an air hose, a standard coupling secured to one end of the hose, and a special coupling secured to the other end of the hose, the shank of said special coupling being off-set in a direction reverse to that of the standard coupling.

2. Means for connecting the air line between railroad cars and the like, including an auxiliary air hose, a standard coupling secured to one end of the hose, a special coupling secured to the other end of the hose, the shank of said special coupling being off-set in a direction counter-clockwise with respect to the center line of the hose extended when the coupling is viewed in top plan, whereby said special coupling when attached to a co-operating coupling member is maintained in connected engagement therewith when said hose assumes its normal operative position.

3. In air brake hose connections for railroad cars, an auxiliary air hose, the lower end of said hose having a standard coupling, the upper end of said hose having an off-set coupling, said coupling being off-set in a direction away from the center line of the hose to form an acute angle therewith of substantially thirty degrees whereby said auxiliary hose is held in connected engagement with standard coupling members on adjacent sections of hose when in normal operative position.

Signed at Ely, Minnesota, this 26th day of May, 1931.

SIDNEY A. MAIN.